US007668507B2

(12) United States Patent
Ramsten et al.

(10) Patent No.: US 7,668,507 B2
(45) Date of Patent: Feb. 23, 2010

(54) SHORT RANGE CONNECTIVITY USABILITY BY USING CONTACT INFORMATION

(75) Inventors: Fredrik Ramsten, Malmo (SE); Emil Hansson, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 646 days.

(21) Appl. No.: 11/424,353

(22) Filed: Jun. 15, 2006

(65) Prior Publication Data

US 2007/0293193 A1 Dec. 20, 2007

(51) Int. Cl.
*H04B 5/00* (2006.01)
*H04B 7/00* (2006.01)
(52) U.S. Cl. .............. 455/41.1; 455/41.2; 455/411
(58) Field of Classification Search ........... 455/41.1–3, 455/403, 404.2, 411, 412.1, 414.1, 421, 422.1, 455/426, 466
See application file for complete search history.

(56) References Cited

U.S. PATENT DOCUMENTS

| 7,171,221 | B1 * | 1/2007 | Amin et al. ............ 455/462 |
| 2005/0136901 | A1 * | 6/2005 | Jung et al. ............ 455/415 |
| 2006/0161663 | A1 * | 7/2006 | Palm ..................... 709/227 |
| 2006/0178110 | A1 * | 8/2006 | Nurminen et al. ....... 455/41.2 |

FOREIGN PATENT DOCUMENTS

| EP | 1 322 071 | 6/2003 |
| WO | 02/11456 | 2/2002 |
| WO | 02/28022 | 4/2002 |

OTHER PUBLICATIONS

International Search Report for International Application No. PCT/IB06/003623 dated Jul. 20, 2007.
International Preliminary Report on Patentability for corresponding International Application No. PCT/IB2006/003623 mailed Sep. 12, 2008.
Peterson et al., "Bluetooth Discovery Time with Multiple Inquirers", 2006, pp. 1-5.
Woodings et al., "Rapid Heterogeneous Connection Establishment: Accelerating Bluetooth Inquiry Using IrDA", May 2006, pp. 1-18.

* cited by examiner

*Primary Examiner*—CongVan Tran
(74) *Attorney, Agent, or Firm*—Renner, Otto, Boisselle & Sklar, LLP (57) ABSTRACT

Disclosed is a system, method and computer application for local communication between electronic equipment in a user-friendly manner. In one aspect of the invention, a mobile telephone initiates a search for electronic equipment having a predetermined modality and within communication range of the mobile telephone. Electronic equipment capable of responding to the request transmit information through a local interface adapter. Such information may include, for example, a unique identifier that may include a telephone number, session initiation protocol (SIP) address of the electronic equipment, user social security number, user and/or contact biometric information, and the like. By receiving the unique identifier of the electronic equipment, the mobile telephone may search an associated electronic phonebook application to identify contact information associated with the unique identifier. For example, if the unique identifier is stored in the electronic phonebook application of the mobile telephone, the mobile telephone may display a user-friendly designation corresponding to contact information previously stored in the electronic phonebook to the associated user of the mobile telephone 10.

16 Claims, 4 Drawing Sheets

| Entry # | Contact Name | Telephone #1 | Telephone #2 | Telephone #3 |
|---|---|---|---|---|
| 1 | Jane Doe | 440 123-5678 | | |
| 2 | Alan | 330 987-1234 | 216 621-1113 | |
| 3 | Zack | 908 678-9012 | | |
| 4 | Mo Rice | 525 696-3427 | 647 111-1111 | 647 121-8888 |
| * | * | * | * | |
| * | * | * | * | |
| * | * | * | * | |
| N | Paige | 123 987-6543 | 867 530-9121 | |

Figure 4
(Prior Art)

| Entry # | Group | Contact Name | Telephone #1 | Telephone #2 | Telephone #3 | Unique Identifier |
|---|---|---|---|---|---|---|
| 1 | Work | Jane Doe | 440 123-5678 | | | 440 123-5678 |
| 2 | Friend | Alan | 330 987-1234 | 216 621-1113 | | AFDWDI |
| 3 | Family | Zack | 908 678-9012 | | | 1-2-4-9090 |
| 4 | Client | Mo Rice | 525 696-3427 | 647 111-1111 | 647 121-8888 | |
| * | * | * | * | * | | * |
| * | * | * | * | * | | * |
| * | * | * | * | * | | * |
| N | N | Paige | 123 987-6543 | 867 530-9121 | | 123 987-6543 |

Figure 7

SHORT RANGE CONNECTIVITY USABILITY BY USING CONTACT INFORMATION

TECHNICAL FIELD OF THE INVENTION

The present invention relates to a method and apparatus for associating electronic equipment through a local interface adapter in a user friendly manner.

DESCRIPTION OF THE RELATED ART

Electronic equipment, such as, for example, communication devices, mobile phones, personal digital assistants, etc. are typically equipped to communicate with cellular telephone communication networks. Such electronic equipment is increasingly being equipped with adapters to support advanced communications in a variety of mediums. Such advanced communication mediums may include, for example, Ethernet, Bluetooth, 802.11, wireless local area networks (WLANs), WiFi, WiMax and the like.

Typically when electronic equipment performs a search to determine available devices having a particular modality (e.g., Bluetooth) in which to connect, all such devices within modality range of the searching electronic equipment are identified to the user. One problem associated with conventional identification is that it is common for the identification to be listed by model number. As such, the identification is not very useful outside a closed group of frequent contacts. Based upon this rather ambiguous identification, a person using electronic equipment has to accept or not accept a request to connect to the ambiguously identified device based upon this limited information. Another problem associated with conventional identification of discovered devices is that the identification is not associated with the electronic equipment user's electronic phonebook. Another drawback is that a user may not limit a search for available devices having a particular modality (e.g., Bluetooth) based on contacts stored in the user's electronic phonebook application stored in the electronic equipment.

SUMMARY

In view of the aforementioned shortcomings associated with identifying and connecting to electronic equipment, there is a strong need in the art for a mechanism to unambiguously identify electronic equipment having common modes of communication and associate such identification with contact information stored in the user's electronic phonebook application.

One aspect of the present invention is directed to a method of exchanging information, the method comprising: providing a mobile telephone having a wireless local interface adapter and an electronic phonebook application; detecting at least one electronic device within a communication range through the wireless local interface adapter; receiving a unique identifier from the at least one electronic device; determining whether the unique identifier is stored in the electronic phonebook application, wherein the electronic phonebook application includes contact information including one or more unique identifiers associated with at least one contact; selecting the at least one electronic device within the communication range; and exchanging information with the selected contact.

Another aspect of the present invention is directed to a method of exchanging information, the method comprising: transmitting a request for information from a mobile telephone, where the request is transmitted through a wireless local area adapter associated with the mobile telephone; receiving unique identification information in response to the request for information from at least one electronic device with a communication range; determining that information associated with the at least one electronic device has previously been stored in the electronic phonebook application of the mobile telephone; and providing an indication that the electronic device is stored in the electronic phonebook application.

Another aspect of the present invention is directed to a computer program stored on a machine readable medium, the program being suitable for use in an electronic equipment having an electronic phonebook application, wherein when the electronic equipment transmits a discovery request through a wireless local interface adapter at least one electronic device in a communication range transmits a unique identifier in response to the discovery, wherein the electronic equipment associates contact information stored in the electronic phonebook application with the received unique identifier.

According to another aspect, the unique identifier is a telephone number associated with the electronic device.

According to another aspect, the unique identifier is a session initiation protocol address associated with the electronic device.

According to another aspect, the unique identifier is biometric information associated with the electronic device.

According to another aspect, a query is displayed on a display of the mobile telephone in a user-sensible format to an associated user prior to the step of selecting the at least one electronic device.

According to another aspect, the information includes at least one from the group consisting of: an image, a multimedia file, a text message, a command line interface prompt or a vCard.

According to another aspect, user input is received from a user input device of the mobile telephone in response to receiving the unique identifier from the electronic device.

According to another aspect, the user input corresponds to a user-friendly designation representing at least one of the electronic device or the contact associated with the electronic device.

According to another aspect, the user input is stored in the electronic phonebook application.

According to another aspect, the received information is an electronic business card of an associated user of the at least one electronic device.

According to another aspect, the electronic business card includes a user-friendly designation representing at least one of the electronic device or the contact.

According to another aspect, a plurality of electronic devices are selected for communication.

According to another aspect, a user is prompted to associate the at least a portion of the received information with the contact in the electronic phonebook.

According to another aspect, exchanging information between the mobile telephone and the at least one electronic device and displaying a user-friendly designation associated with the at least one electronic device during at least a portion of the transmission.

According to another aspect, selecting at least one electronic device within the communication range; and exchanging information with the selected electronic device.

According to another aspect, transmitting information from the mobile telephone in a Bluetooth protocol to the at least one electronic device previously stored in the electronic phonebook application of the mobile telephone and within the communication range.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

The term "electronic equipment" includes portable radio communication equipment. The term "portable radio communication equipment", which herein after is referred to as a mobile radio terminal, includes all equipment such as mobile telephones, pagers, communicators, i.e., electronic organizers, personal digital assistants (PDA's), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The present invention is directed to electronic equipment, sometimes referred to herein as a communication device, mobile telephone, portable telephone and electronic device having an improved method for association and/or discovery through a local interface adapter (e.g. a wired and/or wireless local interface adapter) with other electronic equipment. In one aspect of the invention, a mobile telephone initiates a search for electronic equipment having a predetermined modality and within communication range of the mobile telephone. Electronic equipment capable of responding to the request (e.g., slave electronic equipment) transmit information through a local interface adapter. Such information may include, for example, a unique identifier. The unique identifier may be any unique characteristic, item or feature that may be assigned to a contact. For example, the unique identifier may be a telephone number, a session initiation protocol (SIP) address, biometric information such as fingerprints, retinal scans, iris scans, hand measurements, voice recognition, photographs of the face, anatomical traits, etc. In addition, other exemplary unique identifiers may include social security number, E-mail address, IP address, audio recordings, video recordings, passwords, and the like.

By receiving the unique identifier associated with the electronic equipment, the mobile telephone may search an associated electronic phonebook application having stored unique identifiers information associated with the user to identify contact information associated with the unique identifiers. For example, if a received unique identifier is stored in the electronic phonebook of the mobile telephone, the mobile telephone may display a user-friendly designation corresponding to contact information previously stored in the electronic phonebook to the associated user of the mobile telephone 10.

If the unique identifier is not stored in the electronic phonebook a variety of alternatives may be implemented to display information related to the user of the master electronic equipment. Such alternatives may include, for example, displaying the device name and the telephone number, transmitting an electronic business card (e.g., a vCard) associated with one or more electronic devices in communication range, allowing the user to enter user friendly information associated with the unique identifier into the associated electronic phonebook, etc.

Figure 1:
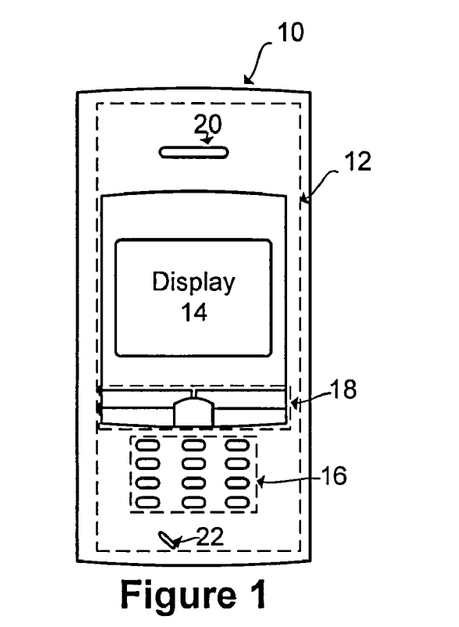
FIG. 1 is a schematic diagram illustrating electronic equipment in accordance with aspects of the present invention.

Referring to FIG. 1, electronic equipment 10 is shown in accordance with the present invention. The electronic equipment 10 in the exemplary embodiment is a mobile telephone and will be referred to as the mobile telephone 10. The mobile telephone 10 is shown as having a "brick" or "block" design type housing, but it will be appreciated that other type housings, such as clamshell housing or a slide-type housing, may be utilized without departing from the scope of the invention.

As illustrated in FIG. 1, the electronic equipment 10 may include a user interface 12 (identified by dotted lines) that enables the user easily and efficiently to perform one or more communication tasks (e.g., identify a contact, select a contact, make a telephone call, receive a telephone call, establish and manage local wireless and/or wired exchanges of information, etc.). The user interface 12 of the mobile telephone 10 generally includes one or more of the following components: a display 14, an alphanumeric keypad 16, function keys 18, a navigation tool 19, a speaker 20, and/or a microphone 22.

The display 14 presents information in a viewable format to a user. Such information may include operating state, time, telephone numbers, contact information, unique identifiers, various navigational menus, status of one or more functions, photographs, multimedia, etc., which enable the user to utilize the various features of the mobile telephone 10. The display 14 may also be used to visually present content accessible by the mobile telephone 10, as well as display contact information from an electronic phonebook in accordance with aspects of the present invention. The displayed content may include E-mail messages, audio and/or video presentations stored locally in memory 24 (FIG. 2) of the mobile telephone 10 and/or stored remotely and download to the mobile telephone 10 (e.g., from a remote storage device, a mail server, remote personal computer, etc.). Such presentations may be derived, for example, from multimedia files stored on a remote web server, received through E-mail messages, etc. The multimedia files may include any type of multimedia content (e.g., video, audio, graphics, songs, movies, television broadcasts, radio broadcasts, satellite radio broadcasts, etc.). The audio component of such presentations, including an end-user code, may be broadcast to the user with speaker 60 of the mobile telephone 10. Alternatively, the audio component may be broadcast to the user though a headset speaker (not shown).

The mobile telephone 10 further includes a keypad 16 that provides for a variety of user input operations. For example, the keypad 16 may include alphanumeric keys for allowing entry of alphanumeric information such as user-friendly identification of contacts, E-mail addresses, distribution lists, telephone numbers, phone lists, contact information, notes, etc. In addition, the keypad 16 typically may include special function keys such as a "call send" key for transmitting an E-mail, initiating or answering a call, and a "call end" key for ending, or "hanging up" a call. Special function keys may also include menu navigation keys, for example, for navigating through a menu displayed on the display 14 to select different telephone functions, profiles, settings, etc., as is conventional. Other keys associated with the mobile telephone 10 may include a volume key, audio mute key, an on/off power key, a web browser launch key, a local adapter association key (e.g., for wired and/or wireless communications), an E-mail application launch key, a camera key, etc. Keys or key-like functionality may also be embodied as a touch screen associated with the display 14.

The mobile telephone 10 also includes conventional call circuitry that enables the mobile telephone 10 to establish a call, transmit and/or receive E-mail messages, and/or exchange signals with a called/calling device, typically another mobile telephone or landline telephone. However, the called/calling device need not be another telephone, but may be some other electronic device such as an electronic device compliant with one or more communication protocols, Internet web server, E-mail server, content providing server, etc.

Figure 2:
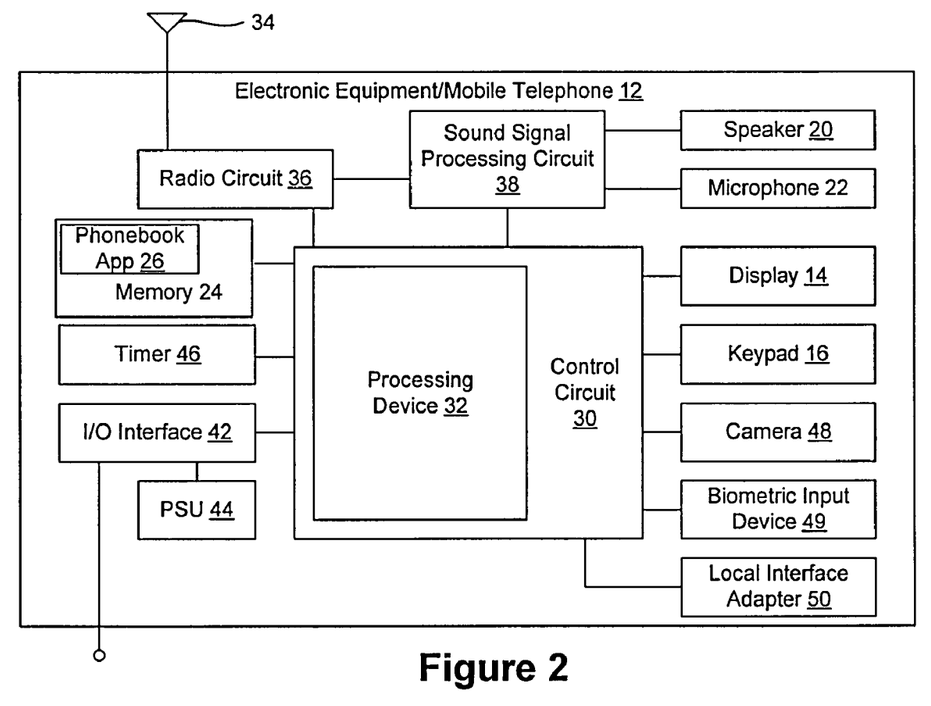
FIG. 2 is a block schematic diagram illustrating electronic equipment in accordance with aspects of the present invention.

Referring to FIG. 2, a functional block diagram of the mobile telephone 10 is illustrated. The mobile telephone 10 includes a primary control circuit 30 that is configured to carry out overall control of the functions and operations of the mobile telephone 10. The control circuit 30 may include a processing device 32, such as a CPU, microcontroller or microprocessor. The processing device 32 executes code stored in a memory (not shown) within the control circuit 30 and/or in a separate memory, such as memory 24, in order to carry out operation of the mobile telephone 10 and perform all of the functionality disclosed herein.

The memory 24 may be any suitable memory device. For example, the memory 24 may be, for example, random access memory, read only memory, a buffer, a flash memory, a hard drive, a removable media, a volatile memory and/or a non-volatile memory. In order to carry out the various functions described herein, the memory 24 may include one or more computer applications (or sub-applications), including a phonebook application 26 to achieve the functionality described herein.

Continuing to refer to FIGS. 1 and 2, the mobile telephone 10 includes an antenna 34 coupled to a radio circuit 36. The radio circuit 36 includes a radio frequency transmitter and receiver for transmitting and receiving signals via the antenna 34 as is conventional. The mobile telephone 10 generally utilizes the radio circuit 36 and antenna 34 for voice, Internet and/or E-mail communications over a cellular telephone network. The mobile telephone 10 further includes a sound signal processing circuit 38 for processing the audio signal transmitted by/received from the radio circuit 36. Coupled to the sound processing circuit 38 are the speaker 20 and a microphone 22 that enable a user to listen and speak via the mobile telephone 10 as is conventional. The radio circuit 36 and sound processing circuit 38 are each coupled to the control circuit 30 so as to carry out overall operation.

The mobile telephone 10 also includes the aforementioned display 14 and keypad 16 coupled to the control circuit 30. The mobile telephone 10 further includes an I/O interface 42. The I/O interface 42 may be in the form of typical mobile telephone I/O interfaces, such as a multi-element connector at the base of the mobile telephone 10. As is typical, the I/O interface 42 may be used to couple the mobile telephone 10 to a battery charger to charge a power supply unit (PSU) 44 within the mobile telephone 10. In addition, or in the alternative, the I/O interface 42 may serve to connect the mobile telephone 10 to a wired personal hands-free adaptor, to a personal computer or other device via a data cable, etc. The mobile telephone 10 may also include a timer 46 for carrying out timing functions. Such functions may include timing the durations of calls, generating the content of time and date stamps, etc.

The mobile telephone 10 may also include various built-in accessories, such as a camera 48 for taking digital pictures. Image files corresponding to the pictures may be stored in the memory 24. In one embodiment, the mobile telephone 10 also may include a position data receiver (not shown), such as a global positioning satellite (GPS) receiver, Galileo satellite system receiver or the like. In another embodiment, the mobile telephone 10 may include a biometric input device 49 for entering biometric information that may be used for scanning and/or otherwise obtaining biometric information associated with the user of the mobile telephone 10 and/or contacts contained in the electronic phonebook 26.

To establish communication with other locally positioned devices, such as a wireless headset, another mobile telephone, a computer, other electronic equipment, etc., the mobile telephone 10 may include a local interface adapter 50. The local interface adapter 50 may be any adapter operable to facilitate communication between the mobile telephone 10 and at least one electronic device. For example, the local interface adapter 50 may be wired and/or wireless and may support communications utilizing any communication protocol (e.g., Ethernet, Bluetooth, 802.11, WLAN, Wifi, WiMax, Infrared, etc.).

The mobile telephone 10 may also be configured to operate in a wide area communications system (e.g. 2G, 3G, GPRS, etc.) (not illustrated). The system may include one or more servers for managing calls, Internet access and/or E-mails placed by and/or destined to the mobile telephone 10, transmitting content (e.g., image files, audio files, video files, etc.) to and/or from the mobile telephone 10 and carrying out any other support functions. The server generally communicates with the mobile telephone 10 via a network and a transmission medium. The transmission medium may be any appropriate device or assembly, including, for example, a communications tower, another mobile telephone, a wireless access point, a satellite, the Internet, etc. Portions of the network may include wireless and/or wired transmission pathways.

Figure 3:
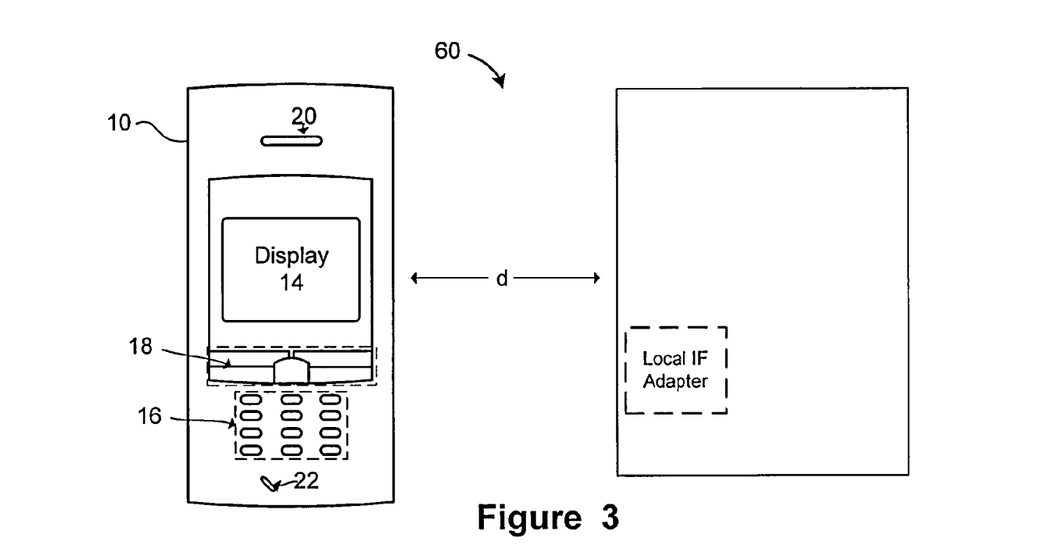
FIG. 3 is an illustration of an exemplary local communication system in accordance with aspects of the present invention.

FIG. 3 illustrates an exemplary communication system 60 in accordance with the present invention. The system 60 includes of a mobile telephone 10 and an electronic device 62. The electronic device 62 may be any electronic device capable of supporting communication with communications through interface adapter 50 of the mobile telephone 10. For example, the electronic device 62 may be electronic equipment, a mobile telephone, a personal digital assistant (PDA), a personal computer (PC), a pager, etc. As stated above, the mobile telephone 10 and the electronic device 62 are adapted to communicate with each other through wireless and/or wired local interface adapters. For example, the mobile telephone 10 and the electronic device 62 are capable of communicating with each other using Bluetooth or any other desirable wired and/or wireless local communication protocols. The following discussion will focus on communications between the mobile telephone 10 and the electronic device 62 using Bluetooth compatible protocols. However, one of ordinary skill in the art will readily appreciate that other communication protocols and/or specifications may also be implemented in accordance with the present invention (e.g., 802.11 compliant standards (e.g. 802.11(a), 802.11(b), 802.11(g), etc.), WiMax, infrared, Ultra Wideband, near field communications, radio frequency identification, Ethernet, etc.).

Bluetooth refers to a technical specification designed to standardize wireless transmission between a wide variety of electronic devices, such as personal computers, cordless telephones, headsets, printers, personal digital assistants ("PDAs"), etc. Bluetooth acts as a "virtual cable", whereby one electronic device can easily communicate with another electronic device. Bluetooth operates using frequency-hopping spread spectrum, where data packets are spread across the 2.45 GHz Spectrum at a rate of 1,600 hops per second to lessen interference. For Bluetooth devices, the nominal link range is 10 meters and the gross data rate is 10 Mbps, although increases may be possible. Bluetooth can support both synchronous connection oriented ("SCO") links for voice and asynchronous connectionless ("ACL") links for packet data.

Referring to FIG. 3, the mobile telephone 10 and the electronic device 62 illustrate communication devices that comprise a mobile ad hoc communication network. In one embodiment, the mobile ad hoc communications network is a Bluetooth piconet that includes one master device and up to seven active slave devices. In operation, the local interface adapter 50, which may be Bluetooth compatible, is activated to conduct an inquiry process to discover all Bluetooth enabled devices in its coverage area (also referred to herein as the communication range). In another embodiment, the inquiry process is limited to only those devices previously stored in the electronic phonebook application 26 of the mobile telephone 10.

For this particular example, mobile telephone 10 and electronic device 62 are within an operative distance "d" from each other, as illustrated in FIG. 3. The distance "d" is within communication range of the mobile telephone 10. One of ordinary skill in the art will readily appreciate that the operative distance "d" will vary depending on, among other things, the modality used for communication. For example, the operative range for Bluetooth communication is less than 10 meters and the operative range for near field communications is less than 10 centimeters.

Referring to FIG. 3, mobile telephone enters into a discovery substate to discover other Bluetooth devices within the operative range. Typically, this occurs by the mobile telephone 10 entering the inquiry substate to discover other Bluetooth devices. The Bluetooth specification defines inquiry access codes that allow a device to specify the type of device it is seeking, such as PDA's, mobile telephones, printers, LAN access points, etc. During the inquiry process, the mobile telephone 10 generates an inquiry hopping sequence. This inquiry hopping sequence is derived from the mobile telephone 10 clock and the chosen inquiry access code. Once the mobile telephone 10 generates an inquiry hopping sequence, it broadcasts inquiry messages as it sequentially switches to each channel defined in the hopping sequence.

Discoverable devices periodically enter the inquiry scan substate. In this substate, devices hop according to the inquiry scan hopping sequence, which is also based on the inquiry access code and the local clock. If the device performing the inquiry scan (e.g., electronic equipment 62) receives an inquiry message, it enters the inquiry response substate and replies with an inquiry response message. The inquiry response includes the remote device's address and clock, a unique identifier (e.g., telephone number, SIP address, etc.).

All discoverable devices within the operative broadcast range "d" will generally respond to the device inquiry. This typically requires the user to manually select the desired device from a list of discovered devices. As stated above, the conventional identifier is presented to the user of the mobile telephone 10 is a model number of the responding device.

During the discovery process related to the present invention, the mobile telephone 10 and the electronic device 62 are capable transmitting a unique identifier. As stated above, the unique identifier may be any unique characteristic, item or feature that may be assigned to a contact. For example, the unique identifier may be a telephone number, a session initiation protocol (SIP) address, biometric information such as fingerprints, retinal scans, iris scans, hand measurements, voice recognition, photographs of the face, anatomical traits, etc. In addition, other exemplary unique identifiers may include social security number, E-mail address, IP address, audio recordings, video recordings, passwords, and the like. As one of ordinary skill in the art will readily appreciate, there are multiple ways to exchange unique identifier information. For example, instead of transmitting a mobile number or other conventional designation, the electronic equipment may be programmed to exchange the unique identifier associated with the electronic equipment. In another embodiment, the user of the electronic equipment may be given the option to respond to the query in a conventional manner and/or by providing a unique identifier. In another embodiment, the unique identifier is provided on a subscriber identity module (SIM) card with information such as the user's phone number, SIP address, phone book as well as other information related to the subscriber.

After obtaining a remote device's unique identifier, the local device may enter the paging substate to establish a communication link with the electronic device. In the paging substate, the local device generally generates a hopping sequence based on the electronic device 62 address and estimated current clock. The paging device then repeatedly sends page messages as it hops through the generated sequence of channels. If a device allows other devices to connect to it, the device will periodically enter the page scan substate. In the page scan substate, a hopping sequence may be generated.

When the electronic device receives a page packet, it responds to the mobile telephone with a page response packet. Upon receiving the response, the mobile telephone sends a frequency hopping synchronization (FHS) packet to the slave. The FHS packet includes the mobile telephone's Bluetooth address and clock. Once the electronic device the FHS packet, it sends an acknowledgment to the mobile telephone. When the mobile telephone receives the acknowledgment, the mobile telephone generates a new hopping sequence from its own address and clock. The electronic device then uses the mobile telephone's hopping sequence. The identical hopping sequences allow the devices to hop on common channels while remaining communicatively linked.

Once the paging process is complete, the devices move to the connection state. The mobile telephone sends a poll packet to the electronic device verifying that the transition from the page hopping sequence to the new hopping sequence is successful. If successful, the two devices continue frequency hopping in a pseudo-random pattern based on the master device's address and clock for the duration of the communication link.

According to the present invention, the mobile telephone 10 and the electronic device 62 are configured to exchange a unique identifier. The exchange of the unique identifier preferably occurs during the discovery process. However, one of ordinary skill in the art will readily appreciate that the exchange of the unique identifier may occur at any desirable time.

The exchange of a unique identifier between the mobile telephone 10 and the electronic device 62 provides a mechanism for gaining access to a phonebook application 26 stored in the mobile telephone 10. Upon exchanging the unique identifier, software, firmware, hardware and/or any combination thereof may be utilized to interface the local interface adapter 50 and the phonebook application 26 to access the unique identifier and utilize the unique identifier to gain access to contact information stored in the phonebook application 26.

By utilizing contacts listed in the phonebook application 26, when the mobile telephone 10 and the electronic device 62 to communicate with each other, information associated with the contact information stored in the phonebook application 26 may be used to identify the user and/or the electronic device 62. Such information may include a user friendly designation (e.g., a contact name, a nickname, telephone number, a photograph, an icon, etc.).

An aspect of the present invention relates to exchanging a unique identifier between a mobile telephone 10 and one or more electronic devices 62. The unique identifier associated with the electronic device (e.g., electronic device 62) may be stored in the electronic phonebook 26 or may be stored on an external source (e.g., a server). The step of storing may occur automatically when the electronic device is within the communication range "d" of the mobile telephone. In addition, the step of storing may be also manual and/or a combination of automatic and/or manual.

Figure 4:
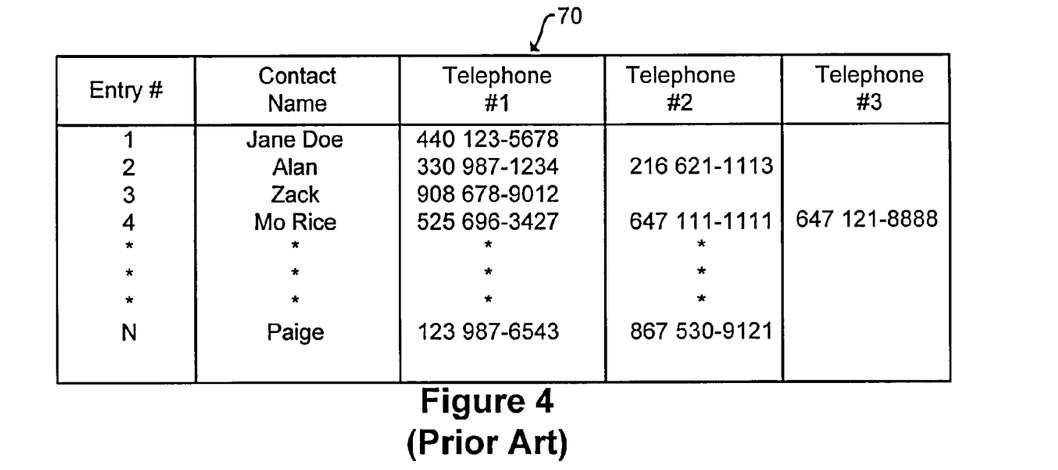
FIG. 4 is a conventional electronic phonebook application.

As shown in FIG. 4, a conventional electronic phonebook 70 can accommodate a plurality of contacts, with each of the contacts including a variety of fields. For example, as shown in FIG. 4, the conventional phonebook 70 includes a plurality of contacts. Each contact generally includes one or more associated fields. Such fields may include, for example, entry number, contact name, and one or more telephone numbers, ring tones, pictures, e-mail addresses, home address, electronic business cards and the like. Mobile telephone users routinely make use of the phonebook function for convenience. Typically electronic phonebooks organize and display contacts based on when the contact information was entered into the phonebook or organized in alphabetical order based on contact name.

The conventional phonebook 70 may also include a vCard associated with the user of the mobile telephone 10. A vCard is a file format standard for personal data interchange, specifically electronic business cards. vCards are often attached to E-mail messages, but can be exchanged in other ways, such as on the World Wide Web. vCards may contain name and address information, phone numbers, URLs, logos, photographs, and audio and/or video clips of the associated user of the mobile telephone 10.

Figure 5:
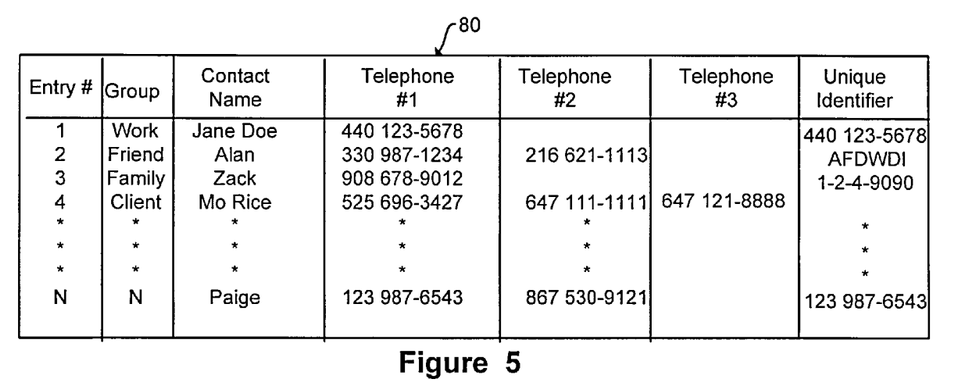
FIG. 5 is an exemplary electronic phonebook application in accordance with aspects of the present invention.

Referring to FIG. 5, an exemplary electronic phonebook 80 in accordance with aspects of the present is illustrated. The electronic phonebook 80 may allow conventional inputting of information for population of the phonebook. For example, the user may manually enter information (e.g., contact name, telephone number, electronic mail address, business card, and the like); the user may also electronically synchronize the electronic phonebook 80 with a remote device (e.g., a personal computer) that contains information for downloading to the electronic phonebook 80.

The electronic phonebook 80 may also use one or more communication protocols to populate one or more contacts and/or entries of the electronic phonebook 80. For example Bluetooth communication protocols may be used to exchange information (e.g., unique identifier information, telephone numbers, SIP address, contact information, electronic business cards, etc.) between mobile telephone 10 and any compatible electronic device (e.g., electronic device 62).

The exemplary electronic phonebook 80 illustrated in FIG. 5 includes a variety of fields. Such fields include, for example, an entry number, a group identification, a contact name, a first telephone number, a second telephone number and a unique identifier field. One of ordinary skill in the art will readily appreciate that the fields listed are exemplary in nature and may be varied based upon artistic and design choices.

As stated above, since the identification of Bluetooth devices are conventionally device names, aspects of the present invention relate to automatically associating the unique identifier of the electronic device with user-friendly information (e.g., contact information) that facilitates identification of the user and/or device when the user of the mobile telephone 10 is within an operating range of an electronic device (e.g., electronic device 62).

In some applications, it may be undesirable to allow the user of the electronic phonebook 80 to have access to the unique identifier stored in the electronic phonebook 80. In some advanced technical and/or administrative application, the electronic phonebook application designer may provide the user with access to stored unique identifiers in the electronic phonebook 80 (e.g., allowing the user to view the unique identifier of the electronic device on the display 14, allowing the user to organize the contact information based upon the unique identifier, etc.).

Figure 6:
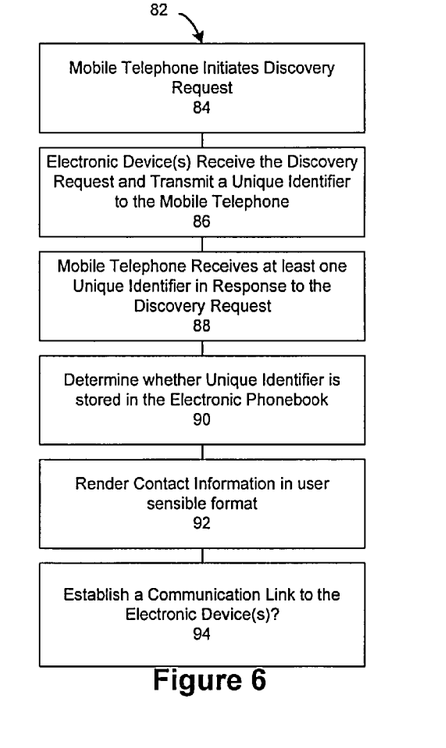
FIG. 6 is a flow illustrating exemplary methods in accordance with aspects of the present invention.

An exemplary method 82 in accordance with aspects of the present invention is illustrated in FIG. 6. Referring to FIGS. 3 and 6, at step 84, the mobile telephone 10 initiates a discovery request to determine if any devices utilizing a modality in common with local area network adapter 50 (e.g., a Bluetooth adapter) are present. One of ordinary skill in the art will readily appreciate that there are a variety of ways to detect presence and/or absence of Bluetooth devices. All such methods fall within the scope of the present invention. This request may be sent to all electronic devices that are in range of the mobile telephone 10 or the request may be sent to only those electronic devices that have a contact listing stored in the electronic phonebook application 80.

At step 86, at least one electronic device (e.g., electronic device 62) receives the discovery request. Upon receiving the discovery request, the electronic device(s) transmits a response to the mobile telephone 10. The response generally includes a unique identifier associated with the electronic device 62. The response is typically transmitted through local interface adapter (e.g., a wireless and/or wired adapter) associated with the electronic device.

At step 88, the local interface adapter 50 of the mobile telephone 10 receives information in response to the request for information from the electronic device 62. The received information is in the form compatible with the local interface adapter 50. As stated above, the received information generally includes unique identifier information and/or any other desired information.

Figure 7:
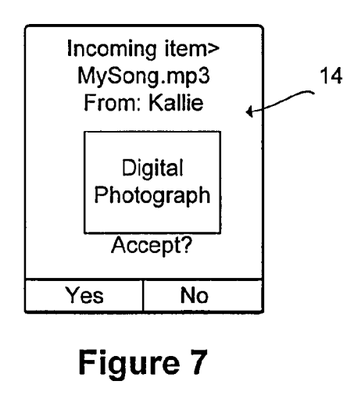
FIG. 7 is an exemplary block diagram of a display in accordance with aspects of the present invention.

At step 90, the mobile telephone 10 determines if the unique identifier and/or other contact information is stored in the electronic phonebook 80. If the unique identifier information is stored in the electronic phonebook 80, at step 92, contact information stored in the electronic phonebook 80 is rendered to the user of the mobile telephone 10 (e.g. on the display 14 and/or speaker 20). As shown in FIG. 7, the contact information may be displayed in the form a photograph associated with the user, include command line information and/or contain any other desired information.

At step 94, the user may determine whether to establish a communication link with the electronic device 62 based, at least in part, on the user friendly information rendered to the user of the mobile telephone 10.

The exemplary method 82 preferably occurs automatically when the mobile telephone 10 comes within a distance "d" (as denoted in FIG. 3) of another Bluetooth-compliant device and/or by user initiation. The method may be initiated by any desired mechanism. For example, a request may be sent automatically by continuously transmitting requests until a response is detected, automatically determining the presence and/or absence of another Bluetooth-compliant device, and/or manually initiated by a user action, etc.

It is also preferable that the exemplary method 82 occurs seamlessly and without user intervention. Thus, when the mobile telephone 10 comes within a distance "d" of an other Bluetooth-compliant device, the unique identifier associated with the Bluetooth-compliant device and/or other contact information is presented on the display 14 of the mobile telephone 10. Accordingly, the unique identifier received from the Bluetooth-compliant device is associated with user-friendly information that facilitates identification of the user and/or device for future communications.

Figure 8:
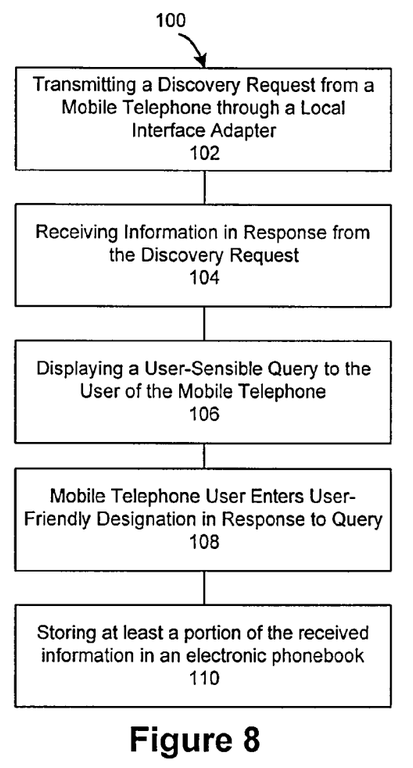
FIGS. 8 and 9 are flow charts illustrating exemplary methods in accordance with aspects of the present invention.

Another exemplary method 100 in accordance with aspects of the present invention is illustrated in FIG. 8. The method 100 allows two devices using a common modality (e.g. Bluetooth) to exchange information through a local interface.

At step 102, a request for information is transmitted from a mobile telephone 10, where the request is transmitted through local interface adapter 50 associated with the mobile telephone 10. The request may be sent automatically by continuously transmitting requests until a response is detected, automatically determining the presence of another Bluetooth-compliant device, automatically determining the presence of Bluetooth-compliant devices stored in the phonebook application 80 and/or manually initiated by a user action.

At step 104, the local adapter 50 associated with the mobile telephone 10 receives information in response to the request for information from one or more electronic devices in communication range of the mobile telephone 10. The received information is in the form of a Bluetooth signal. The response information generally includes a unique identifier and/or any other desirable information.

At step 106, a user-sensible query is displayed on the display 14. The query is presented in a user-sensible format on the display of the mobile telephone 10 to an associated user. In response to the query, at step 108, the user will generally enter user input from the keypad 16. Such user input may correspond to a user-friendly designation representing at least one of the electronic device, the individual contact and/or a group of contacts. Such user-friendly designation will typically include, for example, a name, a nickname, acronym, and/or other indicia which the user of the mobile telephone 10 may use to easily refer to the user and/or another Bluetooth-compliant device (e.g. electronic device 62).

For example, if the device's unique identifier is provided, the display 14 may prompt the user of the mobile telephone 10 to save the unique identifier to the list of contacts in the electronic phonebook application 80. If the user decides to save the number to the list of contacts in the electronic phonebook application 80, the user may be queried to enter a user-friendly designation (e.g., name, nickname, etc.) for the contact. In another example, the electronic device 62 may transmit a vCard for presentation on display 14 of mobile telephone. The user of the mobile telephone 10 may then have the option of storing the vCard in the electronic phonebook application 80.

In a similar manner, if the unique identifier does not include the device's unique identifier, the display may prompt the user of the mobile telephone 10 to save the identity of the contact to the electronic phonebook 80 and also provide one or more graphical user screens on the display to enter such information as a user-friendly designation, telephone number and the like.

At step 110, the electronic phonebook stores at least a portion of the received information from another Bluetooth-compliant device 62 in the electronic phonebook application 80. During the storing step, it may preferable for the display 14 to display a message that the information was stored in the electronic phonebook 80.

Preferably, the contact information entered by user (e.g., user input) is used by electronic phonebook 80 to identify the Bluetooth-compliant device in future communications. For example, if the mobile telephone 10 is receiving a song, for example, from a Bluetooth-compliant device already stored in the electronic phonebook application 80, the display 14 may identify the contact name of the individual and/or device prior to and/or during at least a portion of the song transfer.

Figure 9:
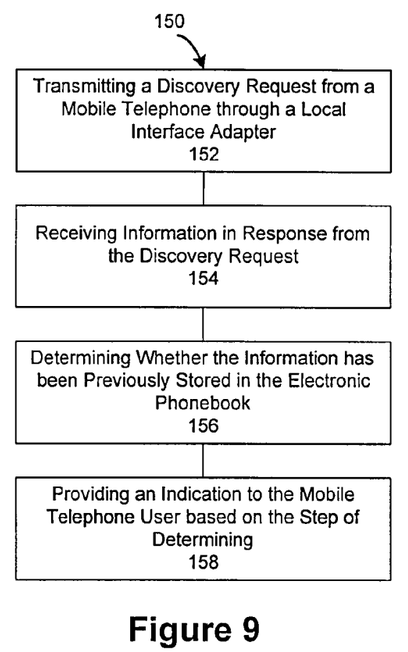

Another exemplary-method 150 in accordance with aspects of the present invention is illustrated in FIG. 9. At step 152, a discovery request for Bluetooth-compatible devices is transmitted from a mobile telephone 10, where the request is transmitted through local interface adapter 50 (e.g., Bluetooth adapter) associated with the mobile telephone 10. The request may be sent automatically by continuously transmitting requests until a response is detected, automatically determining the presence of another Bluetooth-compliant device, automatically determining the presence of another Bluetooth-compliant device stored in the electronic phonebook 80 and/or manually initiated by a user action.

At step 154, the local interface adapter 50 receives information in response to the discovery request from the electronic device 62, wherein the received information is in the form of a Bluetooth signal. The information includes a unique identifier and/or any other information.

At step 156, the electronic phonebook application 80 determines whether the unique identifier information associated with the electronic device 62 has previously been stored in the electronic phonebook application 80 of the mobile telephone 10 and a user-friendly designation has been associated with the electronic device 62.

At step 158, an indication is provided to the user of the mobile telephone 10 that the electronic device 62 previously has been communicatively coupled to the mobile telephone 10. The indication may be any suitable indication mechanism. For example, an indication may be a message (e.g., information, query, status, statement, etc.) displayed on the display 14. Such a message may include, for example, "Welcome back KALLE", assuming the contact name associated with the electronic device 62 was KALLE, "Do you wish to exchange information with KALLE?", etc.) and/or an audible indication (e.g. a beep, a tone, a song, etc.). The indication may be provided for a period prior to initiation of a transfer of information, the entire period the mobile telephone 10 is connected to the electronic device associated with the KALLE designation, and/or the indication may be provided for only a portion of the period that the mobile telephone 10 is connected to the electronic device associated with the KALLE designation.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

What is claimed is:

1. A method of exchanging information, the method comprising:
   providing a mobile telephone having a local interface adapter and an electronic phonebook application;
   detecting at least one electronic device within a communication range through the local interface adapter;
   receiving a unique identifier from the at least one electronic device, wherein the unique identifier is at least one selected from the group consisting of a telephone number and/or a session initiating protocol (SIP) address associated with the at least one electronic device;
   determining whether the unique identifier is stored in the electronic phonebook application, wherein the electronic phonebook application includes contact information including one or more unique identifiers associated with at least one contact;
   selecting the at least one electronic device within the communication range; and
   exchanging information with the selected contact.

2. The method of claim 1, wherein the unique identifier further consists of biometric information associated with the electronic device.

3. The method of claim 1 further including displaying a query on a display of the mobile telephone in a user-sensible format to an associated user prior to the step of selecting the at least one electronic device.

4. The method of claim 1, wherein the information includes at least one from the group consisting of: an image, a multimedia file, a text message, a command line interface prompt or a vCard.

5. The method of claim 1 further including receiving user input from a user input device of the mobile telephone in response to receiving the unique identifier from the electronic device.

6. The method of claim 5, wherein the user input corresponds to a user-friendly designation representing at least one of the electronic device or the contact associated with the electronic device.

7. The method of claim 6 further including storing the user input in the electronic phonebook application, wherein the user input is associated with the at least one contact.

8. The method of claim 1, wherein the received information is an electronic business card of an associated user of the at least one electronic device.

9. The method of claim 8, wherein the electronic business card includes a user-friendly designation representing at least one of the electronic device or the contact.

10. The method of claim 1, wherein a plurality of electronic devices are selected.

11. The method of claim 1 further including prompting an associated user to associate the at least a portion of the received information with the contact in the electronic phonebook.

12. A method of exchanging information, the method comprising:
    transmitting a request for information from a mobile telephone, where the request is transmitted through a local area adapter associated with the mobile telephone;
    receiving unique identification information in response to the request for information from at least one electronic device with a communication range, wherein the information is at least one selected from the group consisting of a telephone number and/or a session initiating protocol (SIP) address associated with the at least one electronic device;
    determining that the information associated with the at least one electronic device has previously been stored in the electronic phonebook application of the mobile telephone;
    providing an indication that the electronic device is stored in the electronic phonebook application.

13. The method of claim 12 further including exchanging information between the mobile telephone and the at least one electronic device and displaying a user-friendly designation associated with the at least one electronic device during at least a portion of the transmission.

14. The method of claim 12 further including selecting at least one electronic device within the communication range; and exchanging information with the selected electronic device.

15. The method of claim 14 further including transmitting information from the mobile telephone in a Bluetooth protocol to the at least one electronic device previously stored in the electronic phonebook application of the mobile telephone and within the communication range.

16. A computer program stored on a machine readable medium in a memory of an electronic equipment, the program being suitable for use in the electronic equipment having an electronic phonebook application, wherein when the electronic equipment transmits a discovery request through a local interface adapter at least one electronic device in a communication range transmits a unique identifier in response to the discovery, wherein the electronic equipment associates contact information stored in the electronic phonebook application with the received unique identifier, wherein the unique identifier received from the at least on electronic device is at least one selected from the group consisting of a telephone number, a session initiation protocol address and/or biometric information associated with the electronic device.

* * * * *